(12) United States Patent
Van Dyke et al.

(10) Patent No.: US 7,805,587 B1
(45) Date of Patent: Sep. 28, 2010

(54) MEMORY ADDRESSING CONTROLLED BY PTE FIELDS

(75) Inventors: James M. Van Dyke, Austin, TX (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 315 days.

(21) Appl. No.: 11/555,628

(22) Filed: Nov. 1, 2006

(51) Int. Cl.
*G06F 9/34* (2006.01)
*G06F 12/00* (2006.01)

(52) U.S. Cl. .................. 711/202; 711/203; 711/206; 711/6; 711/208; 711/209; 711/E21.059

(58) Field of Classification Search .............. 711/202, 711/203, 206
See application file for complete search history.

(56) References Cited

U.S. PATENT DOCUMENTS

| | | | |
|---|---|---|---|
| 5,247,632 A * | 9/1993 | Newman ........................ 711/1 |
| 5,426,750 A * | 6/1995 | Becker et al. ............... 711/207 |
| 6,104,417 A | 8/2000 | Nielsen et al. |
| 2003/0169265 A1 * | 9/2003 | Emberling ................... 345/552 |
| 2005/0237329 A1 | 10/2005 | Rubinstein et al. |
| 2006/0129786 A1 * | 6/2006 | Yamazaki ................... 711/206 |

OTHER PUBLICATIONS

Office Action. U.S. Appl. No. 11/552,082. Dated May 22, 2009.

* cited by examiner

*Primary Examiner*—Mardochee Chery
(74) *Attorney, Agent, or Firm*—Patterson & Sheridan, LLP

(57) ABSTRACT

Embodiments of the present invention enable virtual-to-physical memory address translation using optimized bank and partition interleave patterns to improve memory bandwidth by distributing data accesses over multiple banks and multiple partitions. Each virtual page has a corresponding page table entry that specifies the physical address of the virtual page in linear physical address space. The page table entry also includes a data kind field that is used to guide and optimize the mapping process from the linear physical address space to the DRAM physical address space, which is used to directly access one or more DRAM. The DRAM physical address space includes a row, bank and column address. The data kind field is also used to optimize the starting partition number and partition interleave pattern that defines the organization of the selected physical page of memory within the DRAM memory system.

20 Claims, 6 Drawing Sheets

MEMORY ADDRESSING CONTROLLED BY PTE FIELDS

BACKGROUND OF THE INVENTION

1. Field of the Invention

Embodiments of the present invention generally relate to mapping virtual memory pages to physical memory pages in a local memory system based on dynamic random access memory and, more specifically, to memory addressing controlled by page table entry fields.

2. Description of the Related Art

Conventional graphics processing units use off-chip memory to store different kinds of data, such as image data and texture map data. Because the memory is off-chip, the access speed associated with the memory is inherently slower than accessing or processing on-chip data, thereby creating a performance bottleneck. The data stored within the external memory is used to generate and display sequential frames of graphics images and any input/output bottlenecks associated with accessing the external memory therefore impacts the overall performance of the graphics processing unit. The off-chip memory is typically constructed using multiple DRAM (dynamic random access memory) devices. Sequential bytes in memory are commonly interleaved across the multiple DRAM devices to enable highly efficient access to multiples of a fixed quantity of data. Each such memory access usually includes at least one complete interleave of data across the DRAM devices. This data interleave strategy enables a graphics processing unit to access the locally attached DRAM devices in parallel and potentially achieve a peak memory bandwidth corresponding to the combined read or write bandwidth of all of the locally attached DRAM devices.

The storage elements internal to a modern DRAM device are typically organized into two or more banks. Each bank includes a two-dimensional (2D) array of storage cells organized by row and column number. Each bank also includes a row buffer, which is used to temporarily store data that is read from or written to the array by an input/output interface in the DRAM device. Data within the array is accessed through the row buffer one complete row of data at a time. Thus, a read from the array causes one complete row to be read from the array and stored within the row buffer. A write to the array causes one complete row of data from the row buffer to be written to the array. Prior to any external access to the row of data within the array, a correspondence is first established between the row of data and the row buffer. Establishing this correspondence is commonly referred to as "activating" the row of data and includes the steps needed to transfer data from the row of data within the array into the row buffer. Subsequent reads or writes to the active row are implemented as reads or writes to selected bits within the row buffer. If a read or write is requested on a different, new row of data within the bank, then the current row of data being stored in the row buffer is first written back to the corresponding current row of data within the array. The new row of data is then activated by reading the new row of data within the array into the row buffer. Once activated, the new row of data may be accessed through the row buffer.

The process of activating a row of data within a DRAM device takes time and incurs overhead. Fortunately, modern DRAM devices are able to process an activate command to one bank while simultaneously performing a pending read or write request on a different bank. In this way, the latency associated with an active operation may be "hidden" within the latency of performing the pending access request to a different bank. However, if sequential requests access different rows within the same bank, then the activate operations become serialized, resulting in significantly diminished performance.

The ability to simultaneously access and activate different banks within a DRAM enables a second interleave strategy, referred to herein as "bank interleaving," which may be employed by a graphics processing unit to improve memory efficiency by interleaving sequential groups of bytes across the different banks within a DRAM device. The typical group of bytes interleaved across banks is on the order of the number of bytes within the row buffer or a fraction thereof. Interleaving groups of bytes across multiple banks during sequential accesses decreases the number of bank activation operations that cannot be hidden, resulting in higher overall performance.

The combined strategies of DRAM device and bank interleaving enable very efficient sequential access to DRAM memory for certain types of data. For example, image data that is sequentially refreshed to a display device is accessed with good efficiency most of the time using the two interleaving strategies. However, other kinds of data, such as texture map data, tend to be accessed predominantly in localized 2D regions that move in closed patterns within a larger 2D region. To accommodate data that exhibits 2D access locality, sequential bytes within memory are organized as 2D tiles within a 2D surface of a predefined size. Each tile includes sequential bytes that are interleaved across multiple DRAM devices and interleaved across parallel sets of banks within the DRAM devices. The tiles are laid out in memory in a block-linear organization to better accommodate 2D access locality. When the interleaving strategies described above are combined with the block-linear organization of a 2D surface within the DRAM devices, access "hot spots" naturally develop, whereby a disproportionate number of requests to the same bank within a given DRAM device are generated, leading to an increase in bank conflicts. Further, access hot spots can concentrate access requests within a reduced set of DRAM devices, undermining the efficiency of DRAM device interleaving (also referred to as "data interleaving"). These combined effects negatively impact overall system performance.

For example, when the number of physical memory tiles on a given surface within the local memory is an integral multiple of the number of banks in the local memory DRAM devices, then vertically adjacent tiles are typically mapped to the same DRAM bank number. Bank conflicts arise along the vertical boundary between two vertically adjacent tiles when the access sequence involves alternately accessing data within the two tiles, as would be the case when performing bilinear sampling along a texture space trajectory that straddles the two tiles. While the kind of data and size of the 2D surface determine the vertical alignment of banks and potential layout within the surface, there is really no efficient way for the graphics processing unit to exploit this information in order to avoid the performance degradation associated with memory access hot spots and bank conflicts.

As the foregoing illustrates, what is needed in the art is a technique for efficiently accessing the local memory of a graphics processing unit while avoiding memory access hot spots and bank conflicts.

SUMMARY OF THE INVENTION

One embodiment of the present invention sets forth a method for translating a virtual address to a physical address in a computing device. The method includes the steps of searching a page table for a page table entry that corresponds to the virtual address, retrieving the physical address and a related set of data kind bits from the page table entry, where the data kind bits encode instructions for converting the physical address into the transformed physical address and computing a transformed physical address based on the physical address and the data kind bits.

One advantage of the disclosed method is that the data kind bits may be used to guide and optimize the mapping process from a linear physical address space to a DRAM physical address space that is used to directly access one or more DRAM. The modified mapping process enables bank conflicts and access memory hot spots to be reduced when data is being accessed within the one or more DRAM.

BRIEF DESCRIPTION OF THE DRAWINGS

So that the manner in which the above recited features of the present invention can be understood in detail, a more particular description of the invention, briefly summarized above, is conveyed herein by references to certain embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
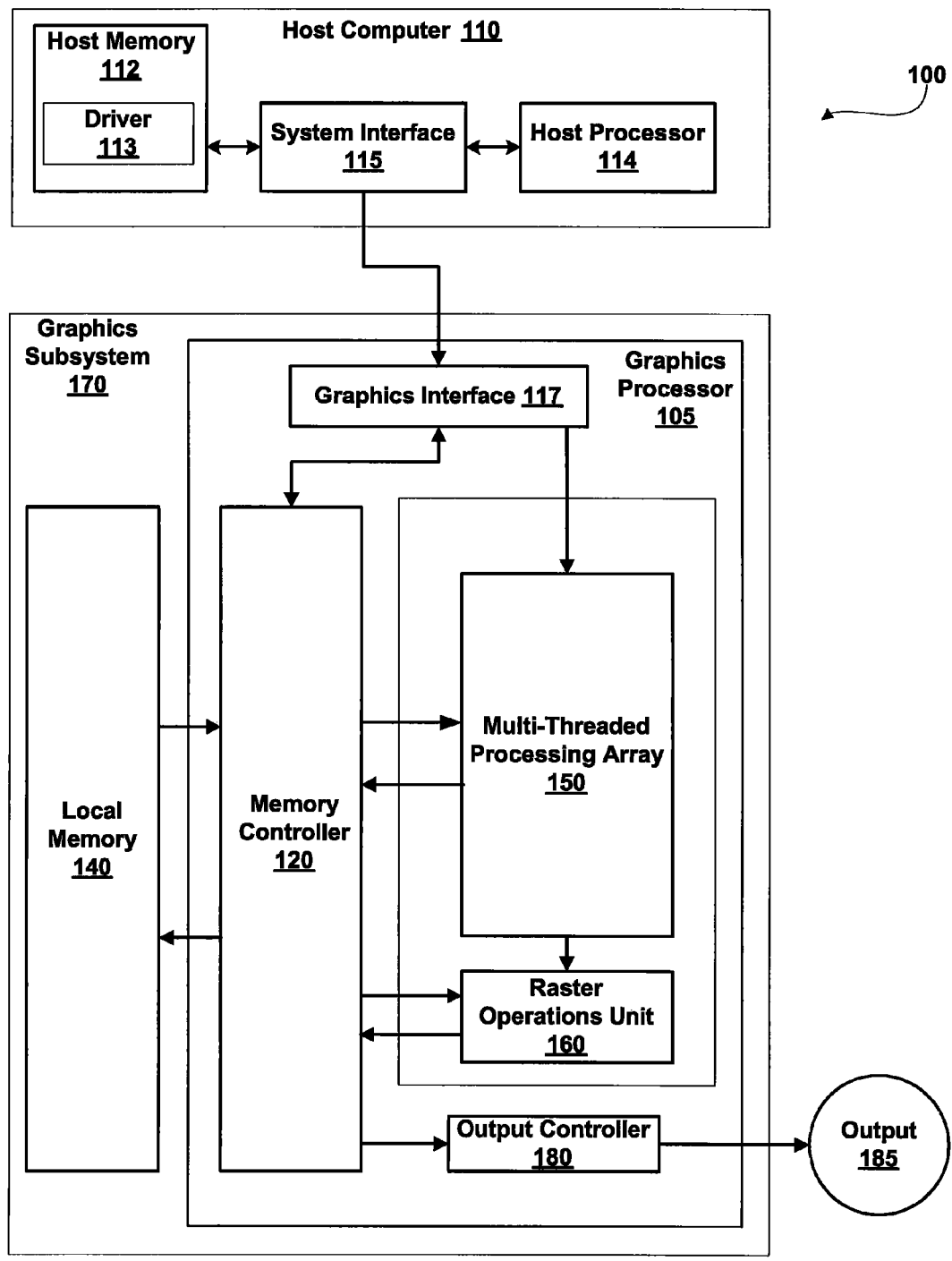
FIG. 1 illustrates a computing system including a host computer and a graphics subsystem, in accordance with one or more aspects of the present invention.

FIG. 1 illustrates a computing system 100 including a host computer 110 and a graphics subsystem 170, in accordance with one or more aspects of the present invention. Computing system 100 may be a desktop computer, server, laptop computer, personal digital assistant (PDA), palm-sized computer, tablet computer, game console, cellular telephone, computer-based simulator, or the like. The host computer 110 includes a host processor 114, a host memory 112, and a system interface 115. The system interface 115 may be an I/O (input/output) interface or a bridge device including a system memory controller that interfaces directly to host memory 112. In one embodiment, the system interface 115 is implemented in an independent component that is external to the host processor 114. In a second embodiment, the system interface 115 is integrated within the host processor 114. The host memory 112 includes one or more dynamic random access memory (DRAM) or similar devices attached to the system interface 115. The output 185 includes results computed by the graphics subsystem 170, such as images or sequences of images that are stored or displayed on a display device (not shown).

A driver 113 is stored in system memory 112 and is executed by the host processor 114. The driver 113 interfaces between processes executed by host processor 114, such as application programs, and a programmable graphics processor 105, and translates program instructions as needed for execution by the graphics processor 105. The driver 113 also uses commands to configure sub-units within the graphics processor 105. Specifically, the driver 113 programs page tables used to translate between virtual memory addresses and physical memory addresses. Contiguous virtual memory pages do not necessarily map to contiguous physical memory pages. Driver 113 may also program page table entries specifying a particular partition stride, bank interleave pattern, and/or partition interleave pattern for each virtual memory page. Driver 113 also allocates virtual memory pages corresponding to portions of a local memory 140 that are used to store graphics surfaces including image data and texture maps.

The graphics subsystem 170 includes the graphics processor 105 and the local memory 140. The local memory 140 includes one or more dynamic random access memory (DRAM) or similar devices. The graphics processor 105 includes a graphics interface 117, a memory controller 120, a multi-threaded processing array 150 and an output controller 180.

Host computer 110 communicates with the graphics subsystem 170 via the system interface 115 and the graphics interface 117 within the graphics processor 105. Data received by the graphics interface 117 can be passed to a multi-threaded processing array 150 or written to a local memory 140 through the memory controller 120. Graphics processor 105 uses graphics memory to store graphics data and program instructions, where graphics data is any data that is input to or output from components within the graphics processor. Graphics memory can include portions of host memory 112, local memory 140, register files coupled to the components within graphics processor 105, and the like.

Graphics processor 105 receives commands from host computer 110 via graphics interface 117. Some of the commands are used by the multi-threaded processing array 150 to initiate processing of data by providing the location of program instructions or graphics data stored in graphics memory. The multi-threaded processing array 150 and a raster operations unit 160 each include an interface to memory controller 120 through which program instructions and data can be read from graphics memory, e.g., any combination of local memory 140 and host memory 112.

The multi-threaded processing array 150 optionally reads processed data, e.g., data written by the raster operations unit 160, from graphics memory and performs additional operations on the processed data before outputting the further processed data to the raster operations unit 160. Multi-threaded processing array 150 and raster operations unit 160 each include one or more programmable processing units to perform a variety of specialized functions. Some of these functions are table lookup, scalar and vector addition, multiplication, division, coordinate-system mapping, calculation of vector normal values, tessellation, calculation of derivatives, interpolation, and the like. Multi-threaded processing array 150 and raster operations unit 160 are each optionally configured such that data processing operations are performed in multiple passes through those units or in multiple passes within Multi-threaded processing array 150. Multi-threaded processing array 150 and raster operations unit 160 each include a read interface to memory controller 120. Raster operations unit 160 also includes a write interface to memory controller 120 through which data can be written to graphics memory.

In a typical implementation, multi-threaded processing array 150 performs geometry computations, rasterization, and pixel computations. Therefore, multi-threaded processing array 150 is programmed to operate on surface, primitive, vertex, fragment, pixel, sample or any other related data. For simplicity, the remainder of this description will use the term "samples" to refer to graphics data such as surfaces, primitives, vertices, pixels, fragments, or the like.

Samples output by multi-threaded processing array 150 are passed to raster operations unit 160, which optionally performs near and far plane clipping and raster operations, such as stencil, z test, and the like, and saves the results or the samples output by multi-threaded processing array 150 in local memory 140. When the data received by graphics subsystem 170 has been completely processed by graphics processor 105, the output 185 of graphics subsystem 170 is provided using the output controller 180. Output controller 180 is optionally configured to deliver data to a display device, network, electronic control system, other computing system 100, other graphics subsystem 170, or the like. Alternatively, data is output to a film recording device or written to a peripheral device, e.g., disk drive, tape, compact disk, or the like.

Figure 2:
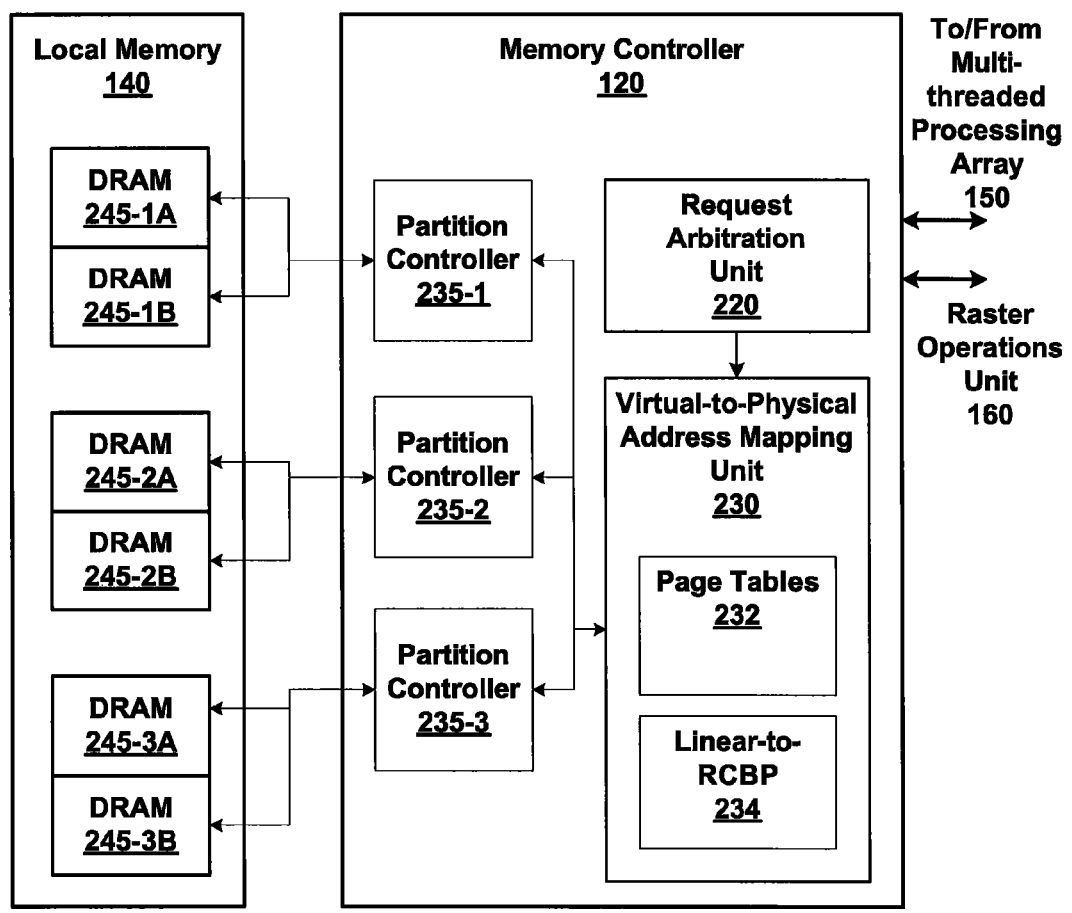
FIG. 2 illustrates memory controller and local memory of FIG. 1, in accordance with one or more aspects of the present invention.

FIG. 2 illustrates memory controller 120 and local memory 140 of FIG. 1, in accordance with one or more aspects of the present invention. Memory controller 120 includes a request arbitration unit 220, a virtual-to-physical address mapping unit 230 and partition controllers 235. Memory controller 120 also includes multiple access ports through which client modules, such as the multi-threaded processing array 150 and the raster operations unit 160, within the graphics processor 105 of FIG. 1 access the local memory 140. The client modules generate access requests in a virtual address space and may present simultaneous requests for access to the local memory 140. However, the local memory 140 is addressed using a row-column-bank-partition (RCBP) space physical address and can typically only service one request at a time. Thus, the memory controller 120 maps the virtual space addresses associated with each client request to an RCBP space physical address for processing by the partition controllers 235 connected to local memory 140. Furthermore, the memory controller 120 provides an arbitration mechanism to serialize the client requests for processing by the partition controllers 235 connected to local memory 140.

More specifically, an arbitration unit 220 serializes the access requests of each client module attempting to gain access to the local memory 140. In order to serialize accesses, one client module is permitted access, generating an active request, while all other client modules are stalled temporarily until the active request is serviced.

The virtual-to-physical address mapping unit 230 translates virtual addresses received from the request arbitration unit 220 into physical addresses in graphics memory. The virtual-to-physical address mapping unit 230 includes page tables 232 that store information used to perform the virtual-to-physical address translation, including the physical address and the kind of data stored within the physical page. The physical address stored within a page table entry within one of the page tables 232 conforms to a linear space physical address, which is independent of the actual physical structure of the local memory 140. When the physical address falls within local memory 140, the linear-to-RCBP transform unit 234 transforms the linear space physical addresses stored within the page tables 232 into RCBP space physical addresses, required by the local memory 140. The RCBP space physical addresses are transmitted from the virtual-to-physical address mapping unit 230 to the partition controllers 235 as part of a client module access request.

The partition controllers 235 receive an RCBP space physical address for processing. The row, bank and column DRAM addresses are extracted along with the partition number, which is generally used to identify which partition controller 235 is associated with the starting point for the client request. Each pair of DRAMs 245 coupled to a partition controller 235 is also referred to as a partition, e.g., DRAM 245-1A and DRAM 245-1B form a partition. Each partition controller 235 corresponds to a unique partition number and is coupled to a pair of DRAMs 245. For example, a first partition controller 235-1 is coupled to DRAM 245-1A and DRAM 245-1B, a second partition controller 235-2 is coupled to DRAM 245-2A and DRAM 245-2B, and a third partition controller 235-3 is coupled to DRAM 245-3A and DRAM 245-3B. In some embodiments of the present invention, memory controller 120 may include one or more partitions with each partition controller 235 including a multi-bit, e.g., 32 bit, 64 bit, or the like, interface to local memory 140. When a manufacturing defect prevents a particular partition controller 235 from functioning properly or when a DRAM 245 is not populated, a number of active (functional) partitions may be updated accordingly and stored in virtual-to-physical address mapping unit 230. The entries storing various virtual memory page mappings are loaded with values that are computed based on the number of active partitions. Therefore, memory controller 120 may be configured to best utilize the portions of local memory 140 that are available.

As previously described, portions of a graphics surface within local memory 140 may be stored in each partition to distribute the data for more efficient access. This distribution results in greater bandwidth utilization and higher performance for memory bandwidth limited functions, such as texture mapping. Each DRAM 245 in local memory 240 is configured to store data in separate banks of memory.

Figure 3:
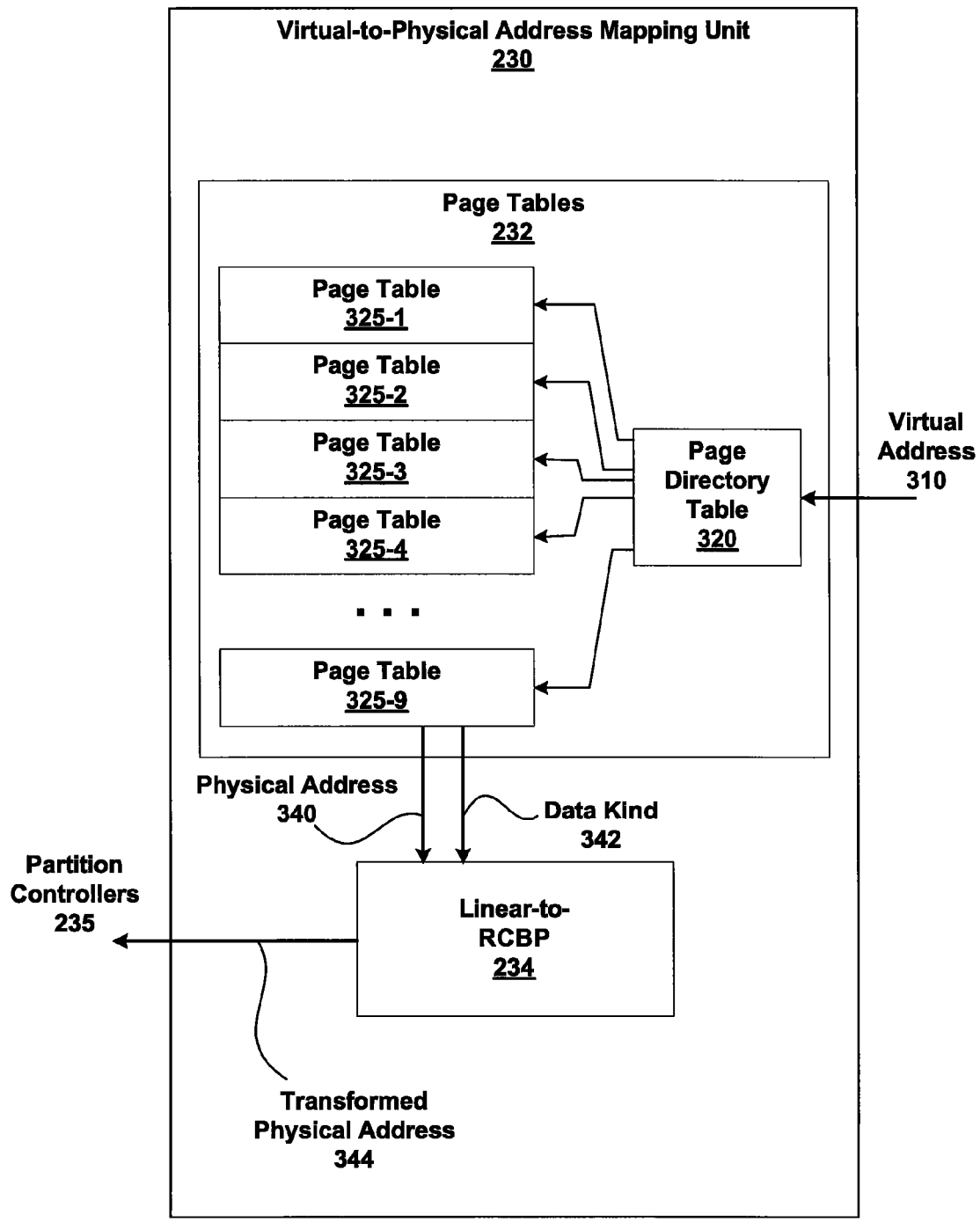
FIG. 3 is a more detailed conceptual diagram of the virtual-to-physical address mapping unit of FIG. 2, in accordance with one or more aspects of the present invention.

FIG. 3 is a more detailed conceptual diagram of the virtual-to-physical address mapping unit 230 of FIG. 2, in accordance with one or more aspects of the present invention. The virtual-to-physical address mapping unit 230 includes a set of page tables 232 and a linear-to-RCBP transform unit 234. As described previously, the virtual-to-physical address mapping unit 230 receives virtual addresses generated by client modules, such as the multi-threaded processing array 150 and the raster operations unit 160, and translates the virtual addresses to RCBP space physical addresses that are then presented to the partition controllers 235. The partition controllers 235 use the row, bank and column components of the RCBP space physical addresses to access their respective attached DRAM devices 245. The partition component of the RCBP space physical address defines which partition controller is defined to be the base partition of the given mapped physical page. The row component of the RCBP space physical address corresponds to the row address within a DRAM device. The column component of the RCBP space physical address corresponds to the column address within the DRAM device. The bank component of the RCBP space physical address corresponds to the bank address within the DRAM device. The partition component of the RCBP space physical address selects the specific DRAM device that stores the starting location of the physical memory page within local memory 140 that is associated with the requested data.

The virtual-to-physical address mapping unit 230 implements a virtual-to-physical translation function via the page tables 232. The page tables form a two-stage lookup structure that includes a first stage lookup that uses a page directory table 320 and a second stage lookup that uses a page table 325. A virtual address 310 is received by the virtual-to-physical address mapping unit 230. A first set of address bits from the virtual address 310 is used as an index into the page directory table 320. This index points to a selected page directory table entry that includes a pointer to a selected page table within the set of page tables 325. Because certain regions of the virtual address space may or may not actually include mapped data, a valid flag is included in each entry within the page directory table 320. If a client module attempts to access an invalid virtual memory address, as indicated by a "false" valid flag, then an error is generated.

Figure 4:
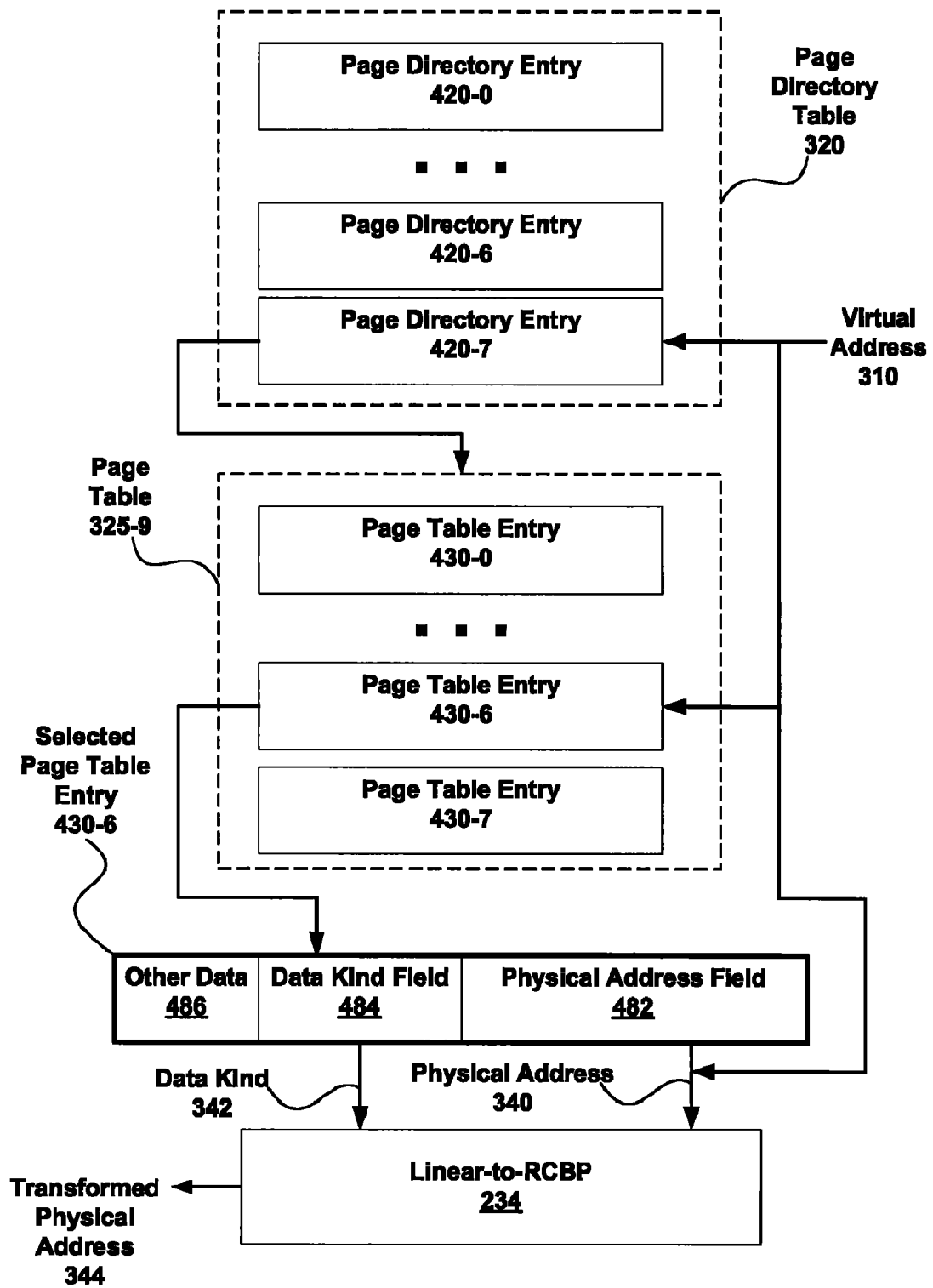
FIG. 4 illustrates the process of mapping a virtual address to a transformed physical address, in accordance with one or more aspects of the present invention.

The selected page table 325 includes a set of page table entries. A second set of address bits from the virtual address 310 is used to index into the selected page table 325, thereby selecting a page table entry (PTE). As shown in FIG. 4, the PTE includes a physical address field 482 and a data kind field 484. The physical address 340 within the physical address field 482 corresponds to the page aligned linear space physical address (upper address bits) of the requested virtual address 310. The data kind field 484 includes a set of bits, represented by a data kind 342, that indicates which specific transforms should be performed on the linear space physical address 340 in order to produce an RCBP space physical address, represented by a transformed physical address 344. Both virtual memory pages and physical memory pages are page-aligned within their respective address spaces. Thus, the lower address bits from the virtual address 310 which address a byte within the virtual memory page, can be copied to the lower address bits of the physical address 340, thereby addressing a byte within the physical memory page. The output of the page tables 232 is therefore the physical address 340 and the data kind 342. Additional other data may also be stored within and emitted from the page tables 232, according to specific implementation requirements.

In one example implementation, a 40 bit virtual address can be broken into the following fields for 4 Kbyte virtual pages:
  Bits [7:0]: Specify a byte within a 256 byte physical region.
  Bits [11:8]: Specify a 256 byte physical region within the 4 Kbyte virtual page.
  Bits [39:12]: Specify the virtual page address.

In this example, bits [39:12] correspond to the first and second sets of address bits used in the two-stage lookup procedure described above. As described below, the lower bits [11:0] are used to optimize the RCBP space physical address mapping, but otherwise typically do not participate in the primary virtual-to-physical mapping.

In a second example, the 40 bit virtual address can be broken into the following fields for 64 Kbyte virtual pages:
  Bits [7:0]: Specify a byte within a 256 byte physical region.
  Bits [15:8]: Specify a 256 byte physical region within the 64 Kbyte virtual page.
  Bits [39:16]: Specify the virtual page address.

In this example, bits [39:16] correspond to the first and second sets of address bits used by the two-stage lookup procedure. Again, as described below, the lower bits [15:0] are used to optimize the RCBP space physical address mapping, but otherwise typically do not participate in the primary virtual-to-physical mapping.

The physical address 340 and data kind 342 are combined within the linear-to-RCBP transform unit 234 to produce the transformed physical address 344, which is then transmitted to the partition controllers 235 for processing. The specific transform functions performed within the linear-to-RCBP transform unit 234 are implementation-specific. However, such functions should incorporate the principle characteristic of swapping regions of memory on a one-to-one basis so that no address aliasing occurs. Furthermore, such transform functions should adapt the specific swapping pattern to the individual characteristics of the 2D surface so as to avoid, when possible, vertical and horizontal adjacency of identical bank numbers. The data kind field 484 stored in each PTE thus enables the linear-to-RCBP transform unit 234 to optimally transform the physical address 340 to a corresponding RCBP space transformed physical address 344. By contrast, in prior art systems no data kind information is available within the PTE and, thus, there is no way to optimize the linear-to-RCBP transform function.

FIG. 4 illustrates the process of mapping a virtual address 310 to a transformed physical address 344, in accordance with one or more aspects of the present invention. The virtual address 310 includes a plurality of virtual address bits, which can be organized into three groups. The first group of virtual address bits is used to index into the page directory table 320 to select a page directory entry 420, such as page directory entry 420-7, within the page directory table 320. The selected page directory entry 420-7 includes a pointer used to select a page table 325, such as page table 325-9. The selected page table 325-9 includes a set of PTEs 430. The second group of virtual address bits is used to index into the selected page table 325-9 in order to select a PTE 430, such as PTE 430-6. The selected PTE 430-6 includes a physical address field 482, a data kind field 484 and other data 486. The physical address field 482 of the selected PTE 430-6 stores the page-aligned physical address of the virtual memory page corresponding to the virtual address 310. This page-aligned physical address forms the upper address bits of the physical address 340. The third group of virtual address bits is used to address byte-level data within the physical page and form the lower address bits of the physical address 340. As described previously, both virtual memory pages and physical memory pages are page-aligned within their respective address spaces, allowing the least significant virtual address bits to be used directly to address byte level data within the physical address space. Thus, the third group of virtual address bits may be copied to their corresponding bit positions within the physical address 340.

The data kind field 484 within the selected PTE 430-6 includes a set of bits indicating the data kind 342 of the data associated with the physical page. The bits making up the data kind 342 may encode characteristics of the data or surface being accessed in the local memory 140 that include, without limitation, the pixel depth, 2D surface size and intended usage of the data. Other data 486 may also be included within the selected PTE 430-6.

The linear-to-RCBP transform unit 234 receives the physical address 340, which is a linear space physical address, and transforms the physical address 340 to a transformed physical address 344, which is an RCBP space physical address. As described previously, the transformed physical address 344 is then transmitted to the partition controllers 235. The linear-to-RCBP transform unit 234 uses the bit settings of the data kind 342 to optimize the linear-to-RCBP transform process so as to avoid linear-to-RCBP mappings that cause bank conflicts and access hot spots to certain partitions within the local memory 140. Since the physical address of the physical page in memory generally remains unchanged by the linear-to-RCBP transformation process, the upper address bits of the physical address 340 and the transformed physical address 344 may be the same. However, since the lower bits of the physical address 340 represent the arrangement of data within the physical page, theses bits are more subject to the optimizations described herein.

The basic linear-to-RCBP transformation is defined using the following five equations that yield four values, corresponding to the transformed row, column, bank and partition addresses of the linear physical address (LPA) input. The basic transform uses a "Stride" value of 256 for a 256 byte-aligned address. Starting with the LPA as input, the partition address, bank address, column address and row address are computed as follows:

Partition=(LPA/Stride) % numberOfPartitions

AWP=(LPA/Stride)/numberOfPartitions

Bank=(AWP*Stride)/DRAMPageSize

Column=(AWP*Stride) % DRAMPageSize

Row=((AWP*Stride)/DRAMPageSize)/numberOfBanks

The address within the partition (AWP) is an intermediate result used in computing the row, column and bank addresses, as specified in the preceding equations. The number of partitions within the local memory 140 is specified by the parameter "numberOfPartitions." The size of the DRAM row buffer, also known as a DRAM page, within the DRAM device is specified by the parameter "DRAMPageSize" and is generally common to devices within a specific generation of DRAM device. The number of banks within the DRAM device is specified by the parameter "numberOfBanks" and is common to a family of DRAM devices within a given generation of DRAM devices. The number of banks within the DRAM device is typically in the range 2 to 8, inclusive.

The basic linear-to-RCBP transformation is invariant with regard to the kind of data stored in the physical page being accessed. In certain cases, the performance of the local memory 140 suffers due to predictable pathological access patterns that result from following the basic linear-to-RCBP transformation. For example, consider a case where the horizontal pitch of a 2D surface mapped into physical memory pages is a multiple of the width of the corresponding DRAM banks mapped through the basic linear-to-RCBP transformation. In this case, the data within a given DRAM bank is stacked vertically within the 2D surface, leading to bank conflicts along the vertical boundaries. In a different example, suppose that the horizontal pitch of a 2D surface mapped into physical memory pages is not a multiple of the width of the corresponding DRAM banks mapped through the basic linear-to-RCBP transformation. In this case, the banks are naturally offset vertically; however, identical partition numbers may abut horizontally within the 2D surface, leading to access hot spots within the partition.

The data kind 342 encodes a set of modifications to the basic linear-to-RCBP transformation that re-organizes blocks of physical memory so as to avoid or minimize the effects of bank conflicts and access hot spots. These modifications specify, without limitation, different partition strides, different partition interleaves, variable partition offsets, and address bit swizzling applied to the lower address bits of the physical address 340. Address bit swizzling may be used, for example, to modify the bank interleave pattern for a particular physical memory page. The specific choice of partition and bank interleave patterns and related offset values is an implementation choice. However, these modifications each have the effect and characteristic of modifying the correspondence between the 2D surface, as defined within the virtual address space, and the physical RCBP layout within DRAM through one-for-one swaps of groups of bytes within the physical memory page. Because the RCBP layout within DRAM interacts with anticipated DRAM access patterns, the linear-to-RCBP transformation can be optimized according to the characteristics encoded in the data kind 342. The data kind 342 information is computed by a resource manager and populated within the appropriate PTE 430 when the virtual-to-physical address mapping is established.

The resource manager (not shown) is a control entity well-known in the art. One of the main responsibilities of the resource manager is allocating two-dimensional surfaces in local memory 140 for storing textures, rendered images, rendered colors, rendered depths, and the like. With the ability to remap physical addresses on the granularity of a page table entry 430, the resource manager is able to allocate physical memory pages with a partition stride, a partition interleave pattern and a bank interleave pattern that are optimized for a given surface based on the attributes of that surface as well as the physical structure of the local memory 140. Such surface attributes include, without limitation, pixel depth, surface width, surface height and access pattern expected for the surface. Importantly, with respect to a given surface, the resource manager is configured to generate page table entries 430 that include a data kind field 484 having the encoded instructions to the linear-to-RCBP transform unit 234 necessary to optimize accesses to that particular surface given the number of physical partitions in the local memory 140 available for memory access. The resource manager is typically implemented in software, such as the driver 113, but may also be implemented in firmware and/or hardware.

Figure 5A:
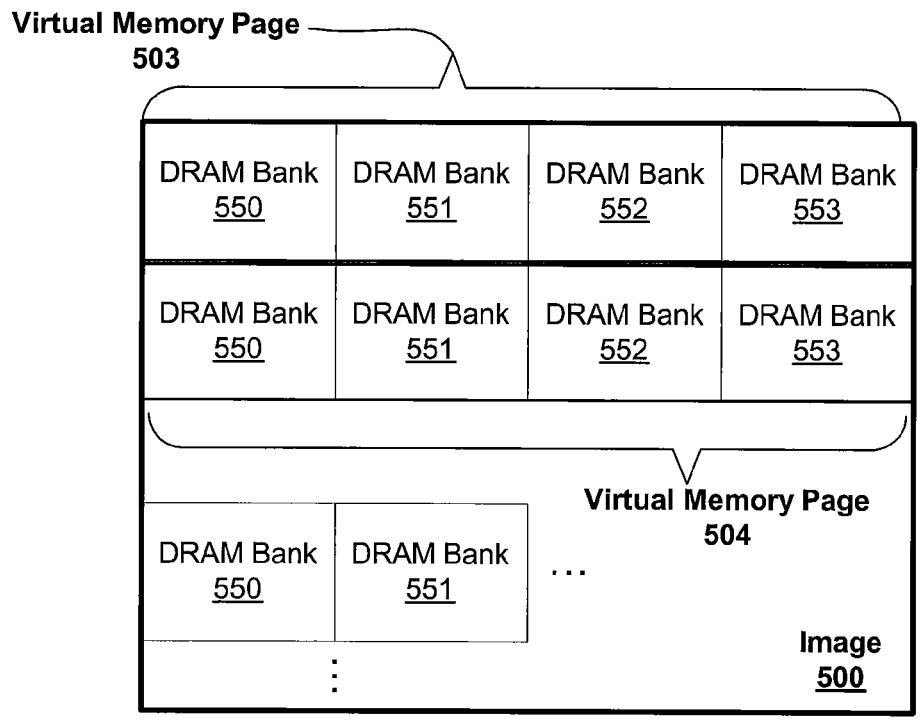
FIG. 5A illustrates a conceptual diagram of a mapping of DRAM banks to a two-dimensional image, in accordance with one or more aspects of the present invention.

FIG. 5A illustrates a conceptual diagram of a non-modified mapping of DRAM banks 550, 551, 552, and 553 to a two-dimensional image, in accordance with one or more aspects of the present invention. Each DRAM 245 may include 2, 4 and 8 or more memory banks that store physical memory pages. The effective size of one page in a bank, i.e., bank page size, is $2^{(w+colBits)}$, where w is the log base 2 of the data bus width of a DRAM 245 in bytes and, colBits is the number of column bits in a DRAM 245. The interleave pattern resulting when a single partition stride is applied across the DRAM partitions is much smaller than the bank page size. Therefore, the same bank across all partitions can be considered to be a superpage distributed over the partitions. The DRAM bank 550 is a first bank across the DRAMs 245 of FIG. 2, DRAM bank 551 is a second bank, DRAM bank 552 is a third bank, and DRAM bank 553 is a fourth bank. Portions of each DRAM bank 550, 551, 552, and 553 are interleaved within image 500, and the memory entries of each bank page are mapped onto a two-dimensional portion of image 500. A superpage is distributed across image 500 as several DRAM banks 550, 551, 552, and 553. The distribution of data over interleaved DRAM banks allows the bank activation delays to be hidden as an image is accessed in a horizontal, vertical, or other linear pattern, e.g., diagonal.

Each virtual memory page 503 and 504 includes one set of DRAM banks 350, 351, 352, and 353. The same interleave pattern is used for virtual memory page 503 and 504. Thus, when the pitch of the surface is a multiple width of the superpage of banks, DRAM bank 550 is vertically aligned within image 500. Likewise, DRAM banks 551, 552, and 553 are also vertically aligned within image 500. Therefore, bank collisions may exist and the bank activation delays may not be hidden, resulting in reduced memory bandwidth utilization when rendering proceeds in the vertical direction.

Figure 5B:
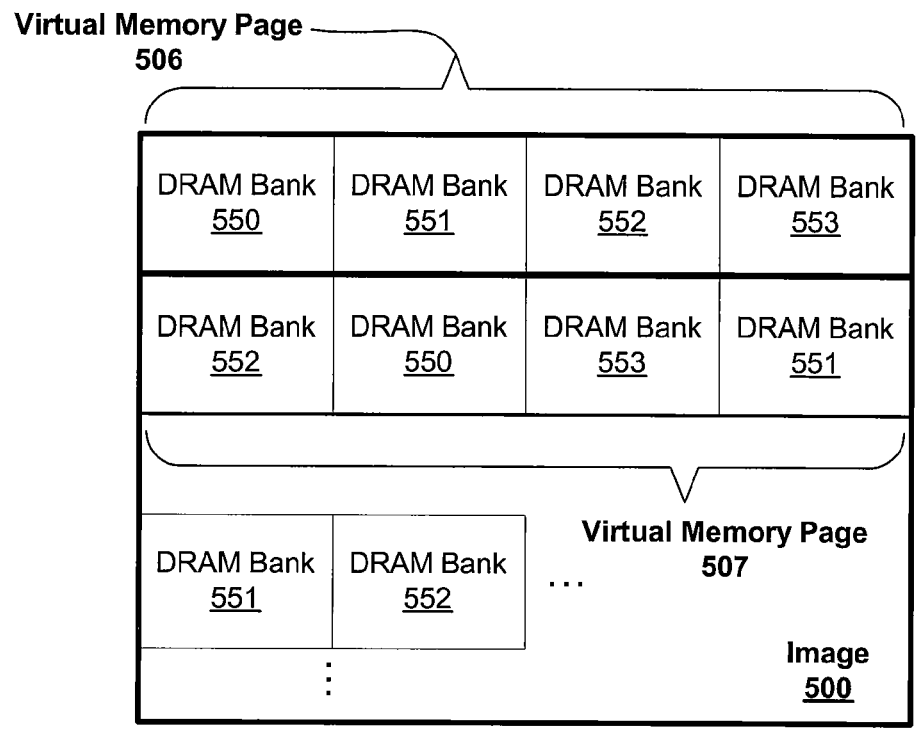
FIG. 5B illustrates a conceptual diagram of a modified mapping of DRAM banks to a two-dimensional image, in accordance with one or more aspects of the present invention.

FIG. 5B illustrates a conceptual diagram of a modified mapping of DRAM banks 550, 551, 552, and 553 to a two-dimensional image 500, in accordance with one or more aspects of the present invention. As shown, the bank interleave pattern specified for virtual memory page 506 is different from the bank interleave pattern specified for virtual memory page 507. Therefore, DRAM bank 550 is not vertically aligned within image 500, and the bank activation delays may be hidden as rendering proceeds in the vertical direction, resulting in increased memory bandwidth utilization. Importantly, different vertical bank alignments result as the width of image 500 varies. Therefore, when determining a bank interleave pattern, the image width that the DRAM bank establishes within the virtual memory pages should be taken into account.

Figure 6:
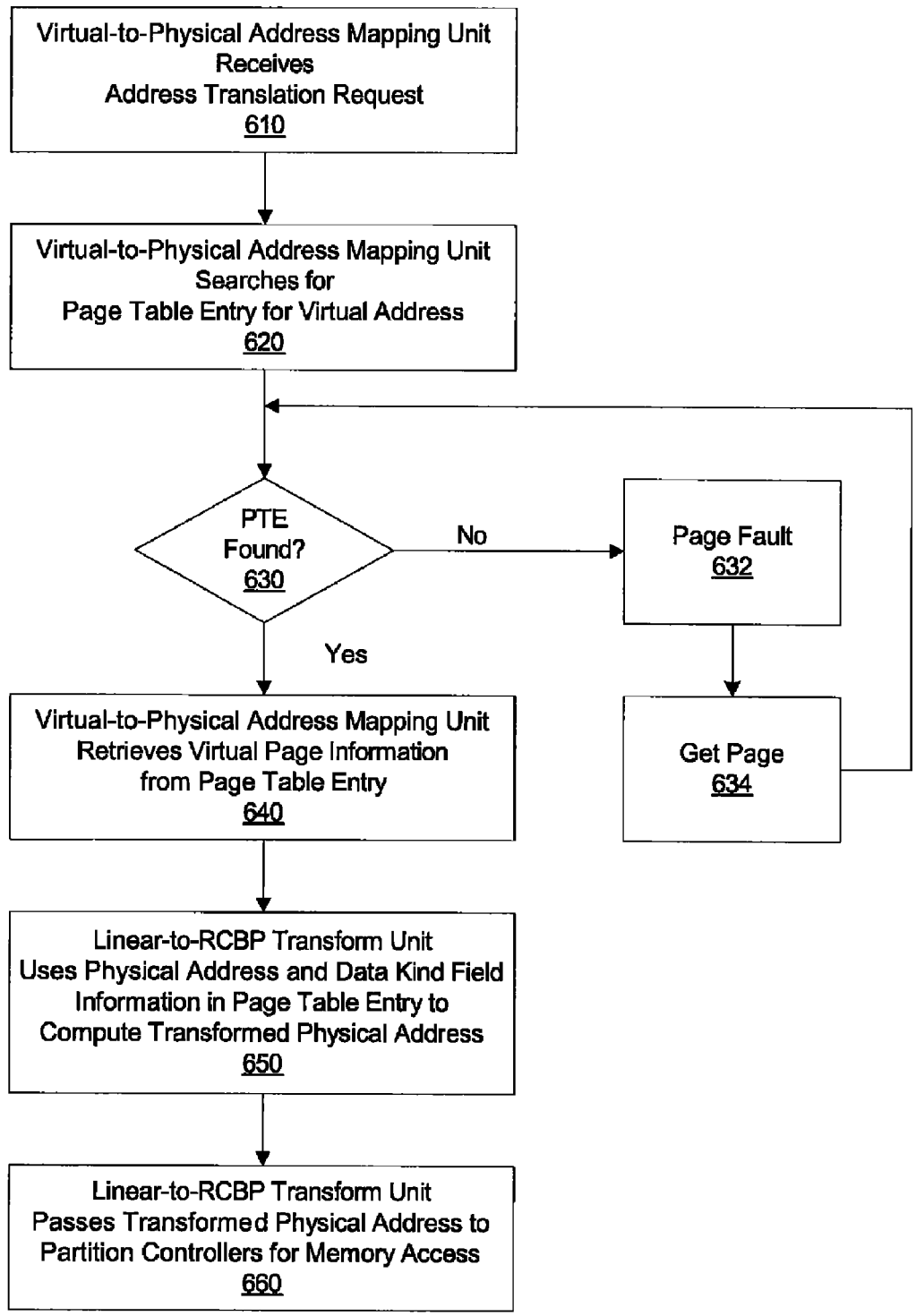
FIG. 6 illustrates a flow diagram of method steps for computing a transformed physical address, in accordance with one or more aspects of the present invention.

FIG. 6 illustrates a flow diagram of method steps for computing a transformed physical address 344, in accordance with one or more aspects of the present invention. Although the method steps are described in conjunction with the systems of FIGS. 1-4, persons skilled in the art will understand that any system that performs the method steps, in any order, is within the scope of the invention.

The method of computing a transformed physical address 344 begins in step 610, where the virtual-to-physical address mapping unit 230 receives an address translation request for a virtual address 310 from the memory controller 120 via the request arbitration unit 220. The method proceeds to step 620, where the virtual-to-physical address mapping unit 230 searches for a page table entry 430 in the page tables 232 corresponding to the requested virtual address 310, according to the two-stage indexed table lookup procedure described in FIGS. 3 and 4. In step 630, if no valid page table entry 430 is found corresponding to the virtual address 310, then the method proceeds to step 632. In step 632, the virtual-to-physical address mapping unit 230 initiates a page fault and proceeds to step 634, where the requested page is then retrieved from disk or any suitable mass storage or memory subsystem. A fatal error condition may terminate the method in either step 632 or 634.

If, in step 630, a page table entry 430 is found that corresponds to the requested virtual address 310, then the method proceeds to step 640, where the virtual-to-physical address mapping unit 230 retrieves the physical address 340 from the corresponding physical address field 482 of the selected PTE 430-6 and the data kind 342 information from the data kind field 484 and transmits this data to the linear-to-RCBP transform unit 234. In step 650, the linear-to-RCBP transform unit 234 uses the data kind 342 information to modify the physical address 340 in order to generate the desired transformed physical address 344, as described in FIGS. 4-5B. In step 660, the linear-to-RCBP transform unit 234 passes the transformed physical address 344 to the partition controllers 235 to initiate a memory access within the local memory 140 at the location of the transformed physical address 344.

In sum, the virtual-to-physical page table entry format is expanded to include a data kind field that is used to guide the process of transforming the linear space physical address stored in the page table entry into a transformed physical address that includes row, column and bank addresses that can then be used by partition controllers to access DRAM. More specifically, the transformed physical address computed by the linear to row-column-bank-partition (RCBP) unit is a function of the physical address modified by the partition stride, partition interleave pattern, bank interleave pattern and starting partition address indicated by the data kind field stored within each page table entry.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense.

We claim:

1. A method for translating a virtual address to a physical address in a computing device, the method comprising:
    searching a page table for a page table entry that corresponds to the virtual address of a two-dimensional (2D) surface that is being accessed in a local memory;
    retrieving the physical address and a related set of data kind bits from the page table entry, wherein the data kind bits encode characteristics of data stored in the local memory at a transformed physical address and are used to convert the physical address into the transformed physical address; and
    computing the transformed physical address based on the physical address and the data kind bits, wherein the data kind bits encode a modification to the physical address to produce a first page bank interleave pattern for a first virtual memory page allocated to the 2D surface and a second page bank interleave pattern for a second virtual memory page allocated to the 2D surface.

2. The method of claim 1, further comprising the step of transmitting the transformed physical address to one or more partition controllers to access data residing at the transformed physical address.

3. The method of claim 1, wherein the physical address includes upper bits and lower bits, and the step of computing comprises swapping, swizzling or offsetting the lower bits of the physical address based on the data kind bits.

4. The method of claim 1, wherein the step of computing comprises swizzling the lower bits of the physical address based on the data kind bits to reposition blocks of data within the 2D surface to reduce access hot spots.

5. The method of claim 1, wherein identical partitions or bank numbers in the 2D surface are adjacent to one another, and the step of computing comprises modifying an interleave pattern of the partitions and/or bank numbers based on the data kind bits to break the adjacency.

6. The method of claim 1, wherein the step of computing comprises incrementing a partition offset based on the data kind bits to rotate partitions within a physical memory page.

7. The method of claim 1, wherein the step of computing further comprises:
    modifying a partition stride based on the data kind bits to produce a modified partition stride; and
    computing a partition component of the transformed address as the physical address divided by the modified partition stride modulo a number of partitions, wherein the partition component of the transformed physical address defines which partition controller of multiple partition controllers that are each coupled to a pair of memory devices is defined as a base partition of the physical page of the local memory.

8. The method of claim 7, wherein the step of computing further comprises computing a bank address, a column address, and a row address using the modified partition stride.

9. A computing device configured to translate a virtual address to a physical address, the computing device comprising:
- a system memory; and
- a processing unit coupled to a local memory and including a memory controller for managing accesses to the local memory, wherein the memory controller includes a virtual-to-physical address mapping unit configured to:
  - search a page table for a page table entry that corresponds to the virtual address of a two-dimensional (2D) surface that is being accessed in the local memory;
  - retrieve the physical address and a related set of data kind bits from the page table entry, wherein the data kind bits encode characteristics of data stored in the local memory at a transformed physical address and are used to convert the physical address into the transformed physical address; and
  - compute the transformed physical address based on the physical address and the data kind bits, wherein the data kind bits encode a modification to the physical address to produce a first page bank interleave pattern for a first virtual memory page allocated to the 2D surface and a second page bank interleave pattern for a second virtual memory page allocated to the 2D surface.

10. The computing device of claim 9, wherein virtual-to-physical address mapping unit is further configured to transmit the transformed physical address to one or more partition controllers to access data within the local memory residing at the transformed physical address.

11. The computing device of claim 9, wherein the physical address includes upper bits and lower bits, and the virtual-to-physical address mapping unit is configured to compute the transformed physical address by swapping, swizzling or offsetting the lower bits of the physical address based on the data kind bits.

12. The computing device of claim 9, wherein the virtual-to-physical address mapping unit is configured to compute the transformed physical address by swizzling the lower bits of the physical address based on the data kind bits to reposition blocks of data within the 2D surface to reduce access hot spots.

13. The computing device of claim 9, wherein identical partitions or bank numbers in the 2D surface are adjacent to one another, and the virtual-to-physical address mapping unit is configured to compute the transformed physical address by modifying an interleave pattern of the partitions and/or bank numbers based on the data kind bits to break the adjacency.

14. The computing device of claim 9, wherein the virtual-to-physical address mapping unit is configured to compute the transformed physical address by incrementing a partition offset based on the data kind bits to rotate partitions within a physical memory page.

15. The computing device of claim 9, wherein the virtual-to-physical address mapping unit is further configured to:
- modify a partition stride based on the data kind bits to produce a modified partition stride; and
- compute a partition component of the transformed address as the physical address divided by the modified partition stride modulo a number of partitions, wherein the partition component of the transformed physical address defines which partition controller of multiple partition controllers that are each coupled to a pair of memory devices is defined as a base partition of the physical page of the local memory.

16. The computing device of claim 15, wherein the virtual-to-physical address mapping unit is further configured to compute a bank address, a column address, and a row address using the modified partition stride.

17. A virtual-to-physical address mapping unit configured to:
- search a page table for a page table entry that corresponds to the virtual address of a two-dimensional (2D) surface that is being accessed in a local memory;
- retrieve the physical address and a related set of data kind bits from the page table entry, wherein the data kind bits encode characteristics of data stored in the local memory at a transformed physical address and are used to convert the physical address into the transformed physical address; and
- compute the transformed physical address based on the physical address and the data kind bits, wherein the data kind bits encode a modification to the physical address to produce a first page bank interleave pattern for a first virtual memory page allocated to the 2D surface and a second page bank interleave pattern for a second virtual memory page allocated to the 2D surface.

18. The virtual-to-physical address mapping unit of claim wherein the physical address includes upper bits and lower bits, and the virtual-to-physical mapping unit is configured to compute the transformed physical address by swapping, swizzling or offsetting the lower bits of the physical address based on the data kind bits.

19. The virtual-to-physical address mapping unit of claim 17 further configured to:
- modify a partition stride based on the data kind bits to produce a modified partition stride; and
- compute a partition component of the transformed address as the physical address divided by the modified partition stride modulo a number of partitions, wherein the partition component of the transformed physical address defines which partition controller of multiple partition controllers that are each coupled to a pair of memory devices is defined as a base partition of a physical page of the local memory.

20. The virtual-to-physical address mapping unit of claim 19, further configured to compute a bank address, a column address, and a row address using the modified partition stride.

* * * * *

UNITED STATES PATENT AND TRADEMARK OFFICE
CERTIFICATE OF CORRECTION

| | | |
|---|---|---|
| PATENT NO. | : 7,805,587 B1 | Page 1 of 1 |
| APPLICATION NO. | : 11/555628 | |
| DATED | : September 28, 2010 | |
| INVENTOR(S) | : Van Dyke et al. | |

It is certified that error appears in the above-identified patent and that said Letters Patent is hereby corrected as shown below:

Column 14, line 33, please replace "claim wherein" with --claim 17, wherein--.

Signed and Sealed this
Twenty-ninth Day of March, 2011

David J. Kappos
*Director of the United States Patent and Trademark Office*